(12) United States Patent
Kantor et al.

(10) Patent No.: US 9,649,613 B2
(45) Date of Patent: May 16, 2017

(54) APPARATUS AND PROCESS FOR THE CONTROLLED REDUCTION OF ORGANIC MATERIAL VIA MICROWAVE RADIATION

(75) Inventors: Steven L. Kantor, Oshawa (CA); Stephen P. Simms, Thornhill (CA)

(73) Assignee: Environmental Waste International, Inc. (CA)

( * ) Notice: Subject to any disclaimer, the term of this patent is extended or adjusted under 35 U.S.C. 154(b) by 0 days.

(21) Appl. No.: 14/122,933

(22) PCT Filed: Jun. 1, 2012

(86) PCT No.: PCT/CA2012/050365
§ 371 (c)(1),
(2), (4) Date: Jan. 30, 2014

(87) PCT Pub. No.: WO2012/162837
PCT Pub. Date: Dec. 6, 2012

(65) Prior Publication Data
US 2014/0161680 A1   Jun. 12, 2014

(51) Int. Cl.
*B01J 19/12* (2006.01)
*C10B 7/06* (2006.01)
(Continued)

(52) U.S. Cl.
CPC .............. *B01J 19/126* (2013.01); *C10B 7/06* (2013.01); *C10B 19/00* (2013.01); *C10B 53/07* (2013.01);
(Continued)

(58) Field of Classification Search
CPC  B01J 19/12; B01J 19/126; B01J 2219/00006; B01J 2219/00033;
(Continued)

(56) References Cited

U.S. PATENT DOCUMENTS 5,877,395 A      3/1999  Emery
2002/0196703 A1*  12/2002  Rumph ..................... 366/183.1
(Continued)

FOREIGN PATENT DOCUMENTS

EP      1 588 783     10/2005
WO      97/33939      9/1997
(Continued)

OTHER PUBLICATIONS

European Patent Office, Supplementary Partial Search Report for Application No. EP 12 79 2766, Mail Date Mar. 12, 2015.
(Continued)

*Primary Examiner* — Xiuyu Tai
(74) *Attorney, Agent, or Firm* — DLA Piper LLP (US)

(57) ABSTRACT

A controllable, continuous-feed system and process for the reduction or depolymerization of organic materials using microwave energy in a reducing, substantially oxygen-reduced atmosphere. The microwave energy is generated by a plurality of magnetrons in a microwave tunnel. Gaseous products may be extracted from the microwave tunnel for recycling and/or analysis. A collector such as a liquid trap may be used to separately collect floating and sinking constituents of the solid products while preventing the escape of the reducing atmosphere from the system.

17 Claims, 12 Drawing Sheets

(51) Int. Cl.
*C10B 19/00* (2006.01)
*C10B 53/07* (2006.01)
*C10G 1/10* (2006.01)
*H05B 6/78* (2006.01)

(52) U.S. Cl.
CPC .............. *C10G 1/10* (2013.01); *H05B 6/78* (2013.01); *B01J 2219/002* (2013.01); *B01J 2219/00006* (2013.01); *B01J 2219/00033* (2013.01); *B01J 2219/00184* (2013.01); *B01J 2219/00238* (2013.01); *B01J 2219/0869* (2013.01); *B01J 2219/0884* (2013.01); *B01J 2219/123* (2013.01); *B01J 2219/1233* (2013.01); *B01J 2219/1239* (2013.01); *B01J 2219/1275* (2013.01); *B01J 2219/1296* (2013.01); *H05B 2206/045* (2013.01); *Y02P 20/143* (2015.11)

(58) Field of Classification Search
CPC ........ B01J 2219/00184; B01J 2219/002; B01J 2219/00238; B01J 2219/0869; B01J 2219/00063; B01J 2219/0009; B01J 2219/00108; B01J 2219/00162; B01J 2219/1215; B01J 2219/1227; B01J 2219/123; B01J 2219/1233; B01J 2219/1239; B01J 2219/126; B01J 2219/1269; H05B 6/78; H05B 2206/045; H05B 6/806; C07B 31/00; C08C 19/00; C09C 1/482; C10B 7/06; C10B 19/00; C10B 53/00; C10B 53/06; C10B 53/07; C10G 1/10; C10G 1/00; A61L 11/00; B09B 3/0075; B09B 3/00; B09B 3/0083; C08J 3/28; C08J 11/10; Y02P 20/143; B03B 9/061

See application file for complete search history.

(56) References Cited

U.S. PATENT DOCUMENTS

2007/0102279 A1\* 5/2007 Novak ........................ 204/157.6
2008/0141589 A1\* 6/2008 Farneman et al. ........ 48/197 FM
2010/0230270 A1 9/2010 Lee et al.

FOREIGN PATENT DOCUMENTS

| WO | WO02/24354 | 3/2002 |
| WO | WO2008/076808 | 6/2008 |
| WO | 2009/098375 | 8/2009 |
| WO | WO2012162837 | 6/2012 |

OTHER PUBLICATIONS

Burnett, Neil. "Microwave Processing of Selected Organic Wastes", Recycling and Reuse of Waste Materials, Proceedings of the International Symposium, Sep. 9-11, 2003. pp. 261-279.

Canadian Intellectual Propertu Office, International Search Report for PCT Application No. PCT/CA2012/050365, mail date Aug. 12, 2012.

The International Bureau, Notification Concerning Submission, Obtention or Transmittal of Priority Document for PCT Application No. PCT/CA2012/050365, mail date Oct. 22, 2012.

\* cited by examiner

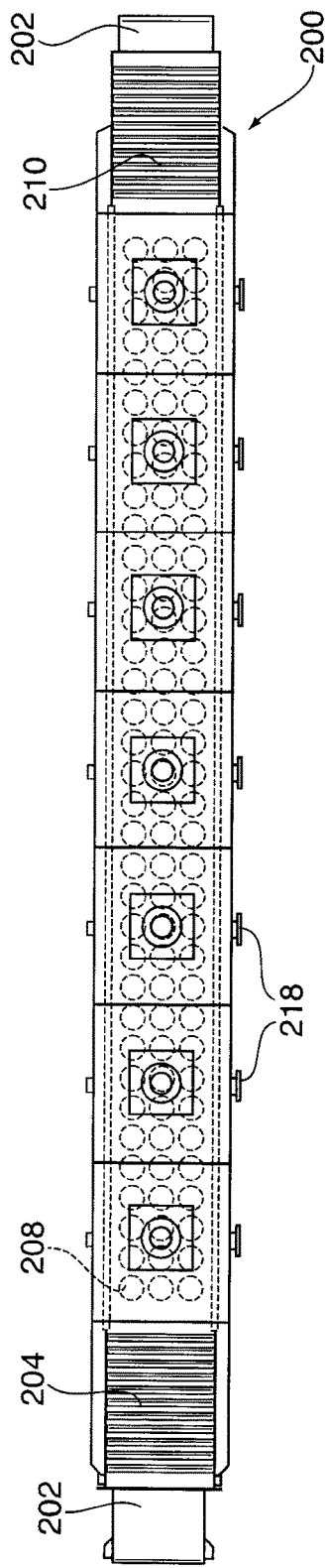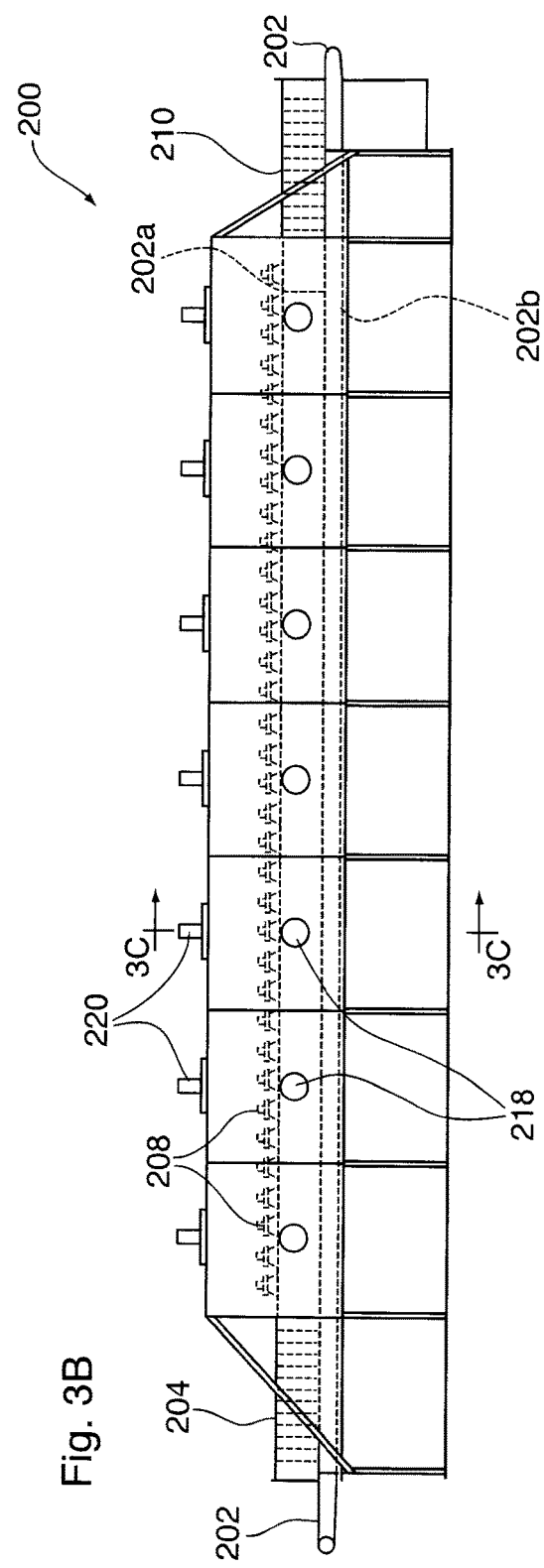

APPARATUS AND PROCESS FOR THE CONTROLLED REDUCTION OF ORGANIC MATERIAL VIA MICROWAVE RADIATION

FIELD OF THE INVENTION

This invention relates to the controlled reduction of organic materials using microwave radiation.

BACKGROUND OF THE INVENTION

There are numerous instances where it is desirable that organic materials be reduced. Such a requirement may arise in the processing of raw materials, as, for example, in the extraction of oil from oil shales, or in the treatment of waste materials, such as worn out tires. The accumulation of such materials, for example in landfills or the like, contributes considerably to environmental pollution.

The processing of raw materials and the treatment of waste materials, such as by burning, may itself lead to environmental pollution problems. Furthermore, by-products of non-pyrolytic reduction of organic materials may be valuable as feedstock for other processes. For example, substantial amounts of the major components of tires, namely hydrocarbons (mainly oil and gas), carbon black and steel may be recycled.

Non-pyrolytic reduction of organic material may be accomplished by subjecting the materials to microwave radiation. For example, U.S. Pat. No. 5,877,395 issued Mar. 2, 1999 for a Method and Apparatus for the Controlled Reduction of Organic Material, which is incorporated herein by reference, describes a method and apparatus for the controlled non-pyrolytic reduction of organic material comprising subjecting the material to microwave radiation in a reducing atmosphere. Such methods may be implemented in large scale continuous-feed systems.

There is therefore an ongoing need for a more efficient and controllable process for the reduction of organic materials.

BRIEF DESCRIPTION OF THE DRAWINGS

In drawings which illustrate by way of example only a preferred embodiment of the invention.

FIG. 3A is a top plan view of the microwave tunnel module of FIG. 1;

FIG. 3B is a front elevational view of the microwave tunnel module of FIG. 3A;

DETAILED DESCRIPTION OF THE INVENTION

According to the invention, a highly controllable, continuous-feed system and process is provided for reduction or depolymerization of organic materials using microwave energy in a reducing, substantially oxygen-free atmosphere.

The following is offered merely as one possible theory of the operation of the invention, without any representation as to its correctness or applicability. It is believed that microwave energy results in the severing of weaker molecular bonds in longer chain molecules to reduce those molecules to simpler forms. This is in effect a depolymerization process. Microwave energy is absorbed by the organic material, causing an increase in molecular vibration and straining inter-molecular bonds, leading to the generation of narrow band infrared energy. Narrow band infrared energy is re-adsorbed by surrounding material, increasing the amount of energy in the bonds until the bonds break. The breaking of the bonds results in the conversion of complex organic compounds into simpler compounds of lower molecular weight. Depolymerization using microwave energy is much faster than pyrolysis and the conversion from long chain polymers to shorter chain molecules is more extensive.

Figure 6:
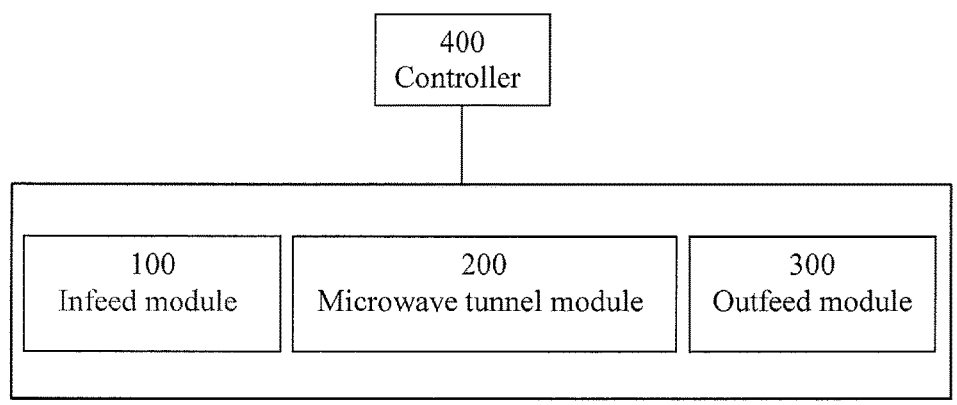
FIG. 6 is a schematic of a system for reduction of organic materials.

In one embodiment shown in FIG. 6, the system comprises three modules: an infeed module 100, a microwave tunnel module 200 and an outfeed module 300. The system may be controlled by a controller, such as a programmable logic controller 400, which may for example be embodied in a data processing apparatus such as a personal computer. As will be known to those skilled in the art, the controller may be implemented as a plurality of controllers, which may or may not be in communication with one another.

Figure 1:
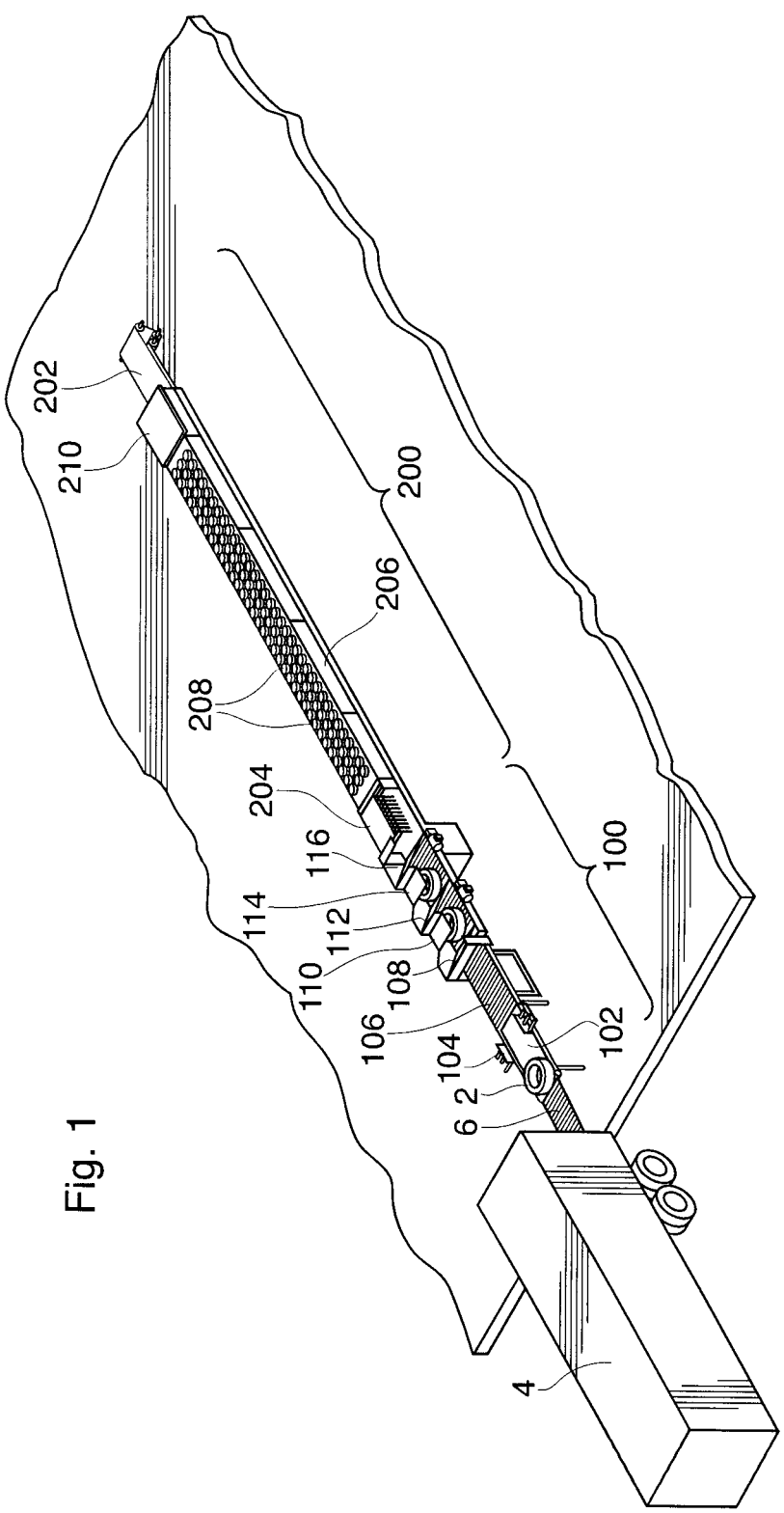
FIG. 1 is a perspective view of infeed and microwave tunnel modules of a system for reducing organic material.

FIG. 1 shows an embodiment of an infeed module 100 connected to a microwave tunnel 200 for reduction of organic material, such as tires 2. As shown in FIG. 1, the infeed module 100 may receive tires 2 via a transfer conveyor 6. The conveyor 6 may, for example, be a gravity roller conveyor. The conveyor 6 may convey the tires 2 from a collection of tires 2 in a trailer 4 or any other source. The tires 2 may be placed consecutively on the transfer conveyor 6 manually or by robotic or any other means. The invention contemplates embodiments in which stacks consisting of a plurality of tires may be consecutively placed on the transfer conveyor 6, and the principles of the invention remain applicable although processing parameters would change accordingly.

In embodiments in which one tire 2 is fed to the transfer conveyor 6 at a time, each tire 2 is received by an infeed conveyor 102. The infeed conveyor 102 may be a belt conveyor such a Titan Industries™ Model 108 Slider Bed conveyor.

As a tire 2 is conveyed by the infeed conveyor 102, the tire may pass a sensor 104 (or a group of sensors) used to determine the size of the tire 2. In the embodiment shown the sensor 104 may comprise a photodector such as an electric eye for detecting obstruction of ambient light or of a light beam directed downward onto the infeed conveyor. Using an electric eye, the size of the tire may be determined based on the period of time the light beam is obstructed by the tire multiplied by the known velocity of the tire 2 on the infeed conveyor 102. Tires 2 may then be transferred to the next conveyer stage such that the tires 2 are spaced apart at preselected intervals on the next conveyor, which would typically be regular intervals for tires of the same size. For example, a space of about two inches (5 cm) between tires may be desirable in some embodiments. The velocity of the infeed conveyor 102 and/or the next conveyor stage (which may be a weight conveyor 106 or an internal conveyor 120) receiving the tires 2 may be constantly varied to create the desired gap between the tires conveyed by the next conveyor stage.

Optionally, the infeed module 100 may also comprise a weight conveyor 106, which weighs the tire 2 as the tire 2 is conveyed to the purge chambers 110, 114. The weight of each tire 2 may be used by the controller to adjust process parameters such as the amount of microwave radiation that should be delivered as the tire 2 progresses through the microwave tunnel module 200, or the operation of any other aspect of the system. The tire 2 may be transferred from the infeed conveyor 102 to the weight conveyor 106. Alternatively, the weight conveyor 106 may receive tires 2 directly from the transfer conveyor 6 and transfer the tire 2 to the infeed conveyor 102, which then conveys the tire 2 to the purge chambers 110, 114. The weight conveyor 106 may comprise a live roller conveyor such as a Hytrol™ Model 199-CRR Chain Driven Live Roller Conveyor supported on legs to convey the tires 2, and one or more load cells located about the weight conveyor 106 to determine the weight of each tire 2. In one embodiment, four load cells may be used; one load cell on each side of the weight conveyor 106, at the upstream and downstream ends of the weight conveyor 106 (e.g. one load cell under each corner or leg of a four-legged weight conveyor 106).

The tire 2 is fed from of the weight conveyor 106 into at least one purge chamber 110. Since it has been found to be advantageous to create the reducing atmosphere in a staged manner, in the preferred embodiment a plurality of purge chambers is provided, two purge chambers 110, 114 in the embodiment shown. Purge chambers 110, 114 are provided to introduce the tires 2 into the low-oxygen reducing atmosphere of the microwave tunnel 200.

Figure 2A:
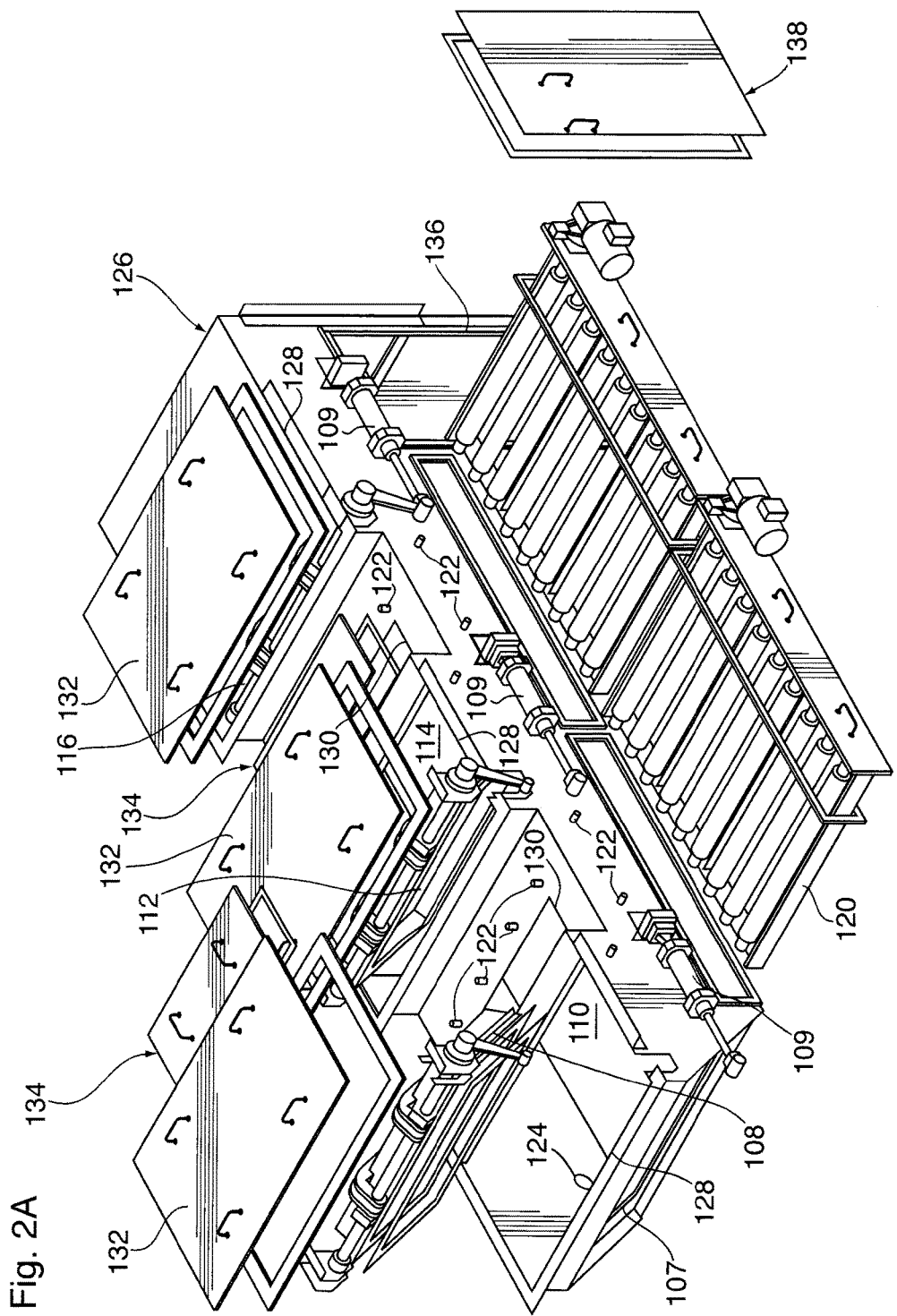
FIG. 2A is an exploded perspective view of the purge chambers of FIG. 1.
Figure 2B:
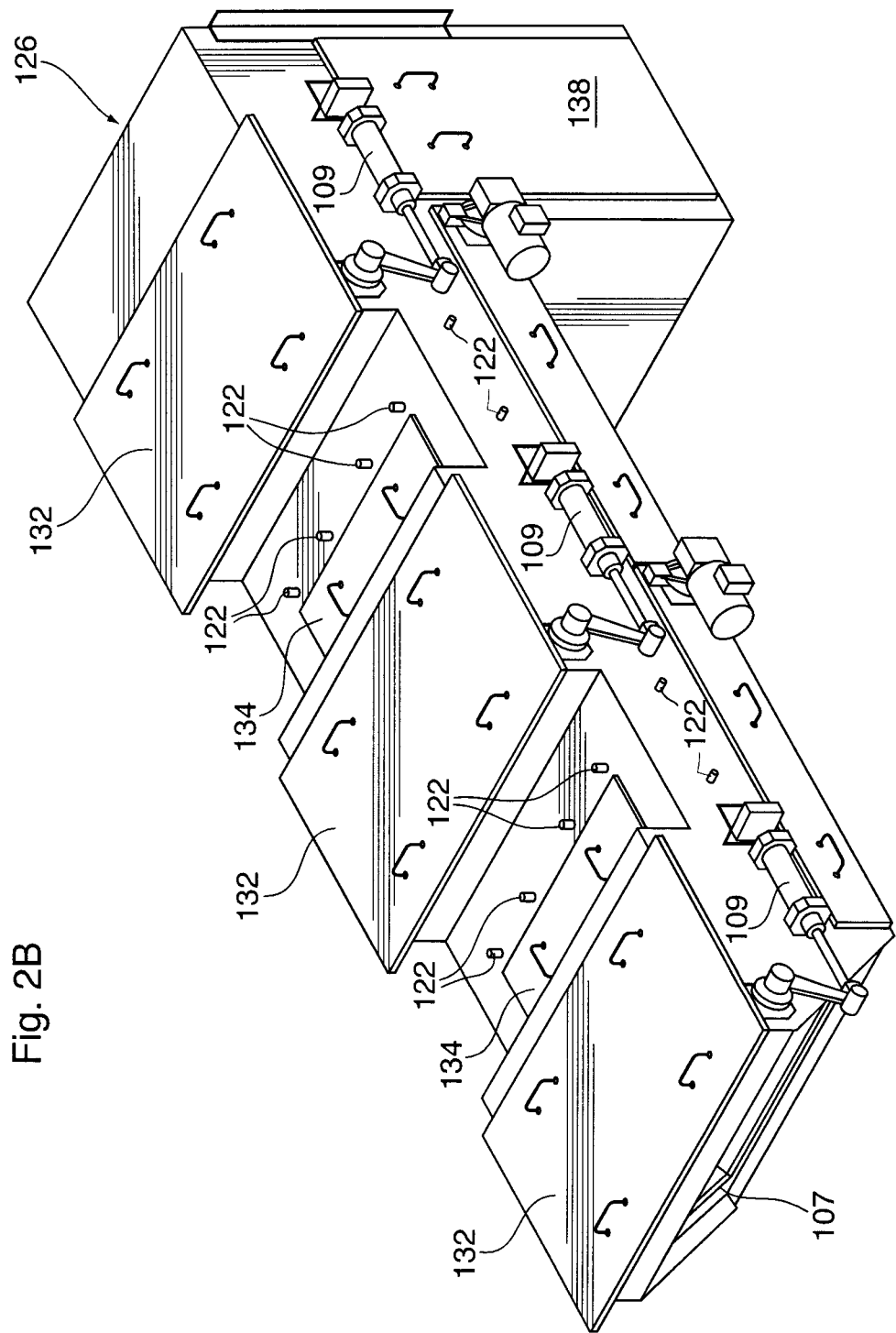
FIG. 2B is a perspective view of the purge chambers of the infeed module of FIG. 2A.
Figure 2C:
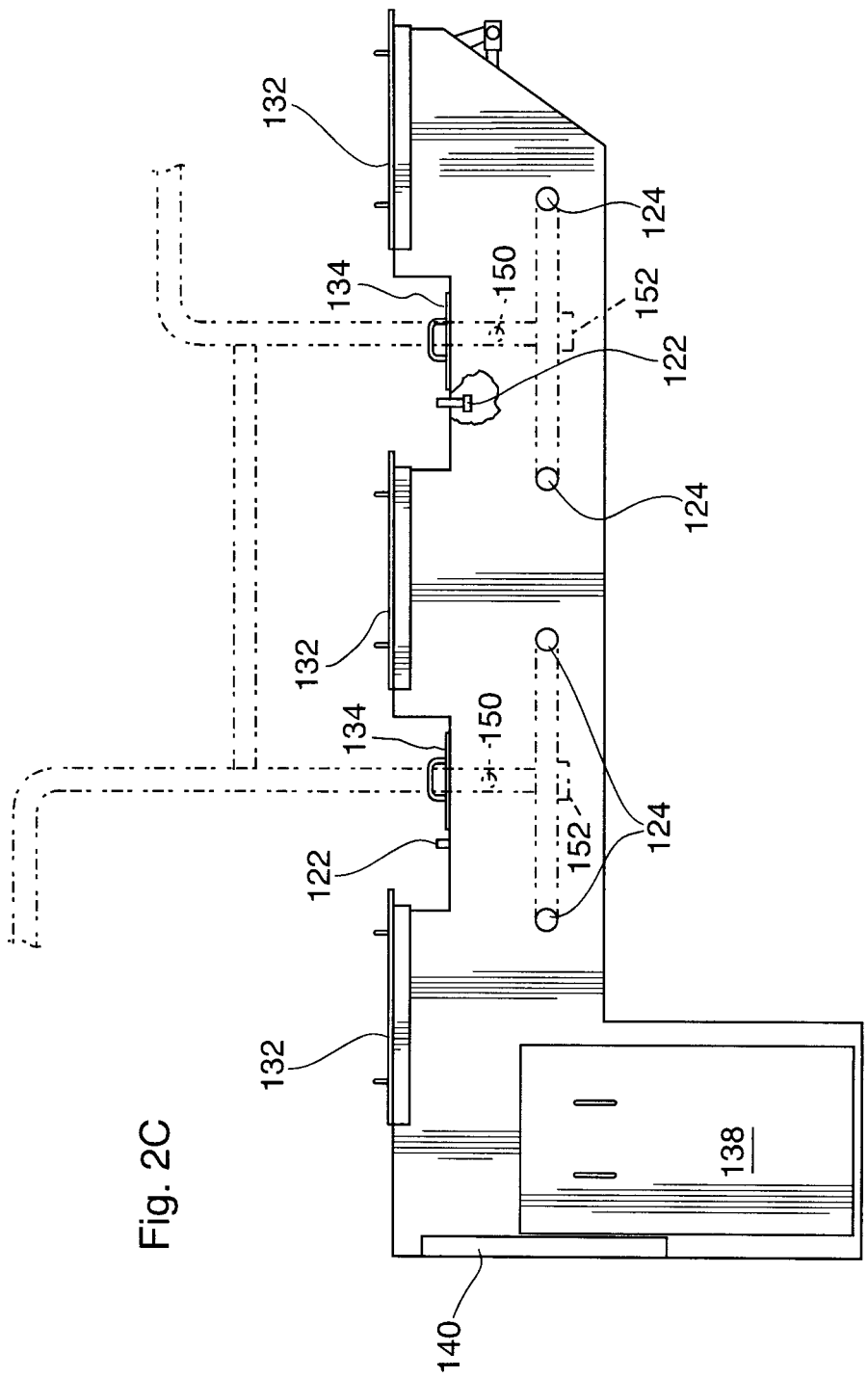
FIG. 2C is a side elevational view of the purge chambers of the infeed module of FIG. 2A with piping for the purge chamber vents shown in phantom.

With reference to FIGS. 2A, 2B and 2C, each tire 2 is conveyed through the purge chambers 110, 114 by internal purge conveyor 120. Purge conveyor 120 may be a live roller conveyor, which receives the tire 2 from either the infeed conveyor 102 or the weight conveyor 106 as described above. The purge chambers 110, 114 will be injected with a reducing gas such as nitrogen to displace the ambient air in the purge chambers 110, 114, which contains oxygen, and create a reducing atmosphere. The tire 2 enters the first purge chamber 110 through closures, in the embodiment shown comprising a first gate 108 and, after a selected portion of the ambient air is displaced in the manner described below, the tire 2 is conveyed by the purge conveyor 12 through a second gate 112, located downstream from the first gate 108, to exit the first purge chamber 110. The first and second gates 108, 112 may be flop gates operated by hydraulic cylinders 109 controlled by the controller.

Thus, when the first and second gates 108, 112 are closed, the interior of the first purge chamber 110 is isolated from the ambient atmosphere outside the system. Gate 112 opens for tire 2 to enter a second purge chamber 114, which is sealed to the first purge chamber 110 to allow communication of gases between the first and second purge chambers 110, 114 but isolate the interior of the first and second purge chamber 114 from the ambient atmosphere outside the system. As the tire 2 exits the first purge chamber 110 through the second gate 112, and is conveyed through the second purge chamber 114, the second gate 112 closes to isolate the interior of the second purge chamber 114 from the interior of the first purge chamber 110. The partially-reducing atmosphere in the second purge chamber 114 is further displaced by the reducing gas (or a different reducing gas) to approximate the reducing atmosphere of the microwave tunnel 200. The tire 2 exits the second purge chamber 114 through a third gate 116. The third gate 116 may also be a flop gate providing sealed closure for isolating the interior of the second purge chamber 114 from the reduced atmosphere of the microwave tunnel 200, opening only when the atmosphere in the second purge chamber 114 is approximately the same as the atmosphere inside of the processing tunnel 200.

The first purge chamber 110 and the second purge chamber 114 may be provided in a housing 126 formed from sheet steel or any other suitable material, with one or more maintenance portals 128 allowing access to the gates 108, 112, 116 and/or one or more portals 130 allowing access to nozzles 122 which inject the reducing gas into the respective purge chambers 110, 114 to displace the ambient air therein. One or more portals 136 may also be provided for access to an area below the second purge chamber 114. Each portal is closed by covers 132, 134, 138.

In operation of the embodiment shown, oxygen is removed from the purge chambers 110, 114 by purging ambient air from in and around the tires 2 before they enter the microwave tunnel 200. In one embodiment, oxygen is removed by displacing air from the purge chambers 110, 114 with nitrogen gas ($N_2$) injected via nozzles 122. The nitrogen gas may be supplied by a Pressure Swing Absorption (PSA) generator (not shown) that provides nitrogen at approximately 99.5% purity. For example, a BOC brand PSA generator may be used to supply the substantially nitrogen purge gas. If nitrogen pressure is lost, the controller will automatically shut down the system in a safe and orderly manner. The nitrogen generator may include a surge (not shown), which provides an emergency supply of nitrogen in case of depletion of nitrogen from the main nitrogen supply.

Figure 2D:
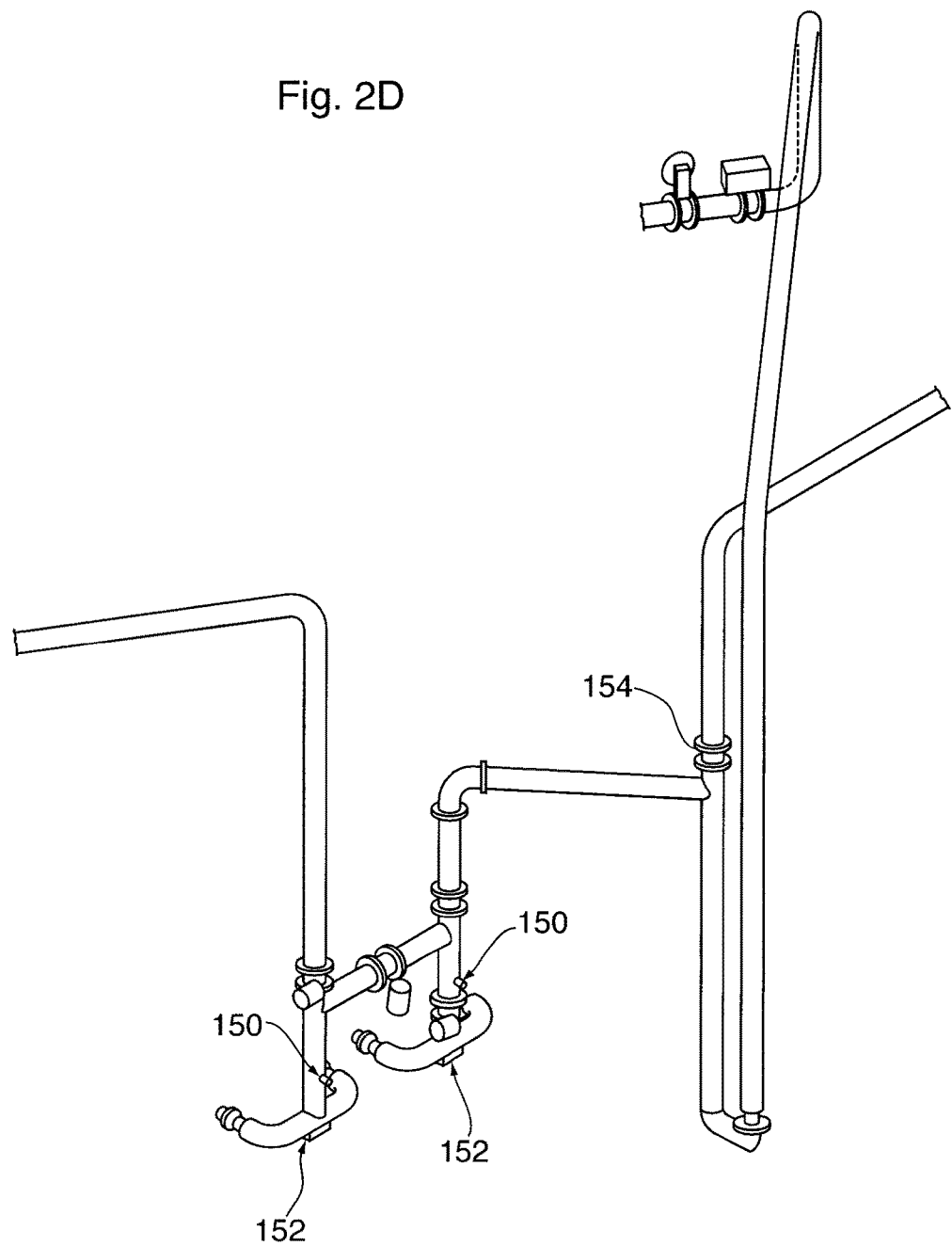
FIG. 2D is a perspective view of the piping for the purge chamber vents of the infeed module of FIG. 2A.

On start-up of the system, before tires 2 enter the system, the first and second purge chambers 110, 114 may be purged to predetermined oxygen levels. For example, the first purge chamber 110 may be purged to less than 5% oxygen and the second purge chamber 114 may be purged to less than 1% oxygen. As the purge chambers 110, 114 are purged, oxygen sensors 150 monitor the oxygen concentration in each purge chamber 110, 114 and pressure switches 152 (shown in FIG. 2D) limit the pressure in each of the purge chambers 110, 114.

To purge the first purge chamber 110, one or more vent valves in vents 124 is opened, one or more fan bypass valves or dampers 154 is closed and a nitrogen purge valve is opened to allow nitrogen gas to flow into the first purge chamber 110 through one or more nozzle 122. If the pressure switch 152 is activated, the nitrogen purge valve is closed until the switch is deactivated. When the oxygen sensor 150 detects that the selected reduced oxygen level or threshold has been reached, the purge process is stopped, the fan bypass valve is opened and the vent valve is closed. The second gate 112 is then opened and tire 2 is conveyed through the gate 112 into the second purge chamber 114, which is purged in a similar manner to the selected reduced oxygen level of the first purge chamber 110, simultaneously with the first purge chamber 110, or sequentially, or with partially overlapping purge intervals starting before or after purging of the first purge chamber 110 commences.

When a tire 2 is sealed in the first purge chamber 110 and both the first and the second gates 108, 112 are closed, the purging system is activated. Ambient air may be purged from the first purge chamber 110 in the manner described above until the first pre-determined oxygen level is reached. To activate the purge process in the first purge chamber 110, the controller may receive signals from one or more purge position sensors (such as load cells and/or an electric eye) indicating that a tire 2 is in the purge position and/or that the first and second gates 108, 112 are closed, which in turn triggers a flag indicating that a purge is required to be activated in the controller and causes the controller to execute the purging process in the first purge chamber 110 as described above. When the oxygen sensor detects that the selected lowered oxygen level in the first purge chamber 110 is reached, the nitrogen purge valve is closed, the fan bypass valve is opened and the vent valve is closed. The controller flag indicating that a purge is required may be reset to signify that the purge of the first purge chamber 110 is complete. If a second purge chamber 114 is provided and if second purge chamber 114 was not purged on start-up of the system, the second purge chamber 114 is purged to the selected reduced oxygen level of the first purge chamber 110, preferably simultaneously with the first purge chamber 110, or alternatively sequentially or with partially overlapping purge intervals, so that as the flop gate 112 is opened the lowered oxygen level in the first purge chamber 110 is not contaminated by a higher-oxygen atmosphere in the second purge chamber 114.

When the tire 2 is advanced to a purge position in the second purge chamber 114, and both the second and the third flop gates 112, 116 are closed, purging is activated in the second purge chamber 114. Ambient air is purged from the second purge chamber 114 in the manner described above until the second pre-determined lowered oxygen level is reached. To activate the purge process in the second purge chamber 114, the controller may receive signals from one or more purge position sensors (such as load cells and/or an electric eye) indicating that a tire 2 is in the purge position and/or that the second and third gates 112, 116 are closed, which in turn triggers a flag indicating that a purge is required to be activated in the controller and causes the controller to execute the purging process in the second purge chamber 114 as described above. When the oxygen sensor 150 associated with the second purge chamber 114 detects that the required oxygen level is reached, the nitrogen purge valve is closed, the fan bypass valve is opened and the vent valve is closed. The controller flag indicating that a purge is required may be reset to signify that the purge of the second purge chamber 114 is complete.

The tire 2 is then conveyed out of the second purge chamber 114 through the third gate 116, out of the infeed module 100 via exit 140 and on to the tunnel conveyor 202 of the microwave tunnel module 200.

Figure 3C:
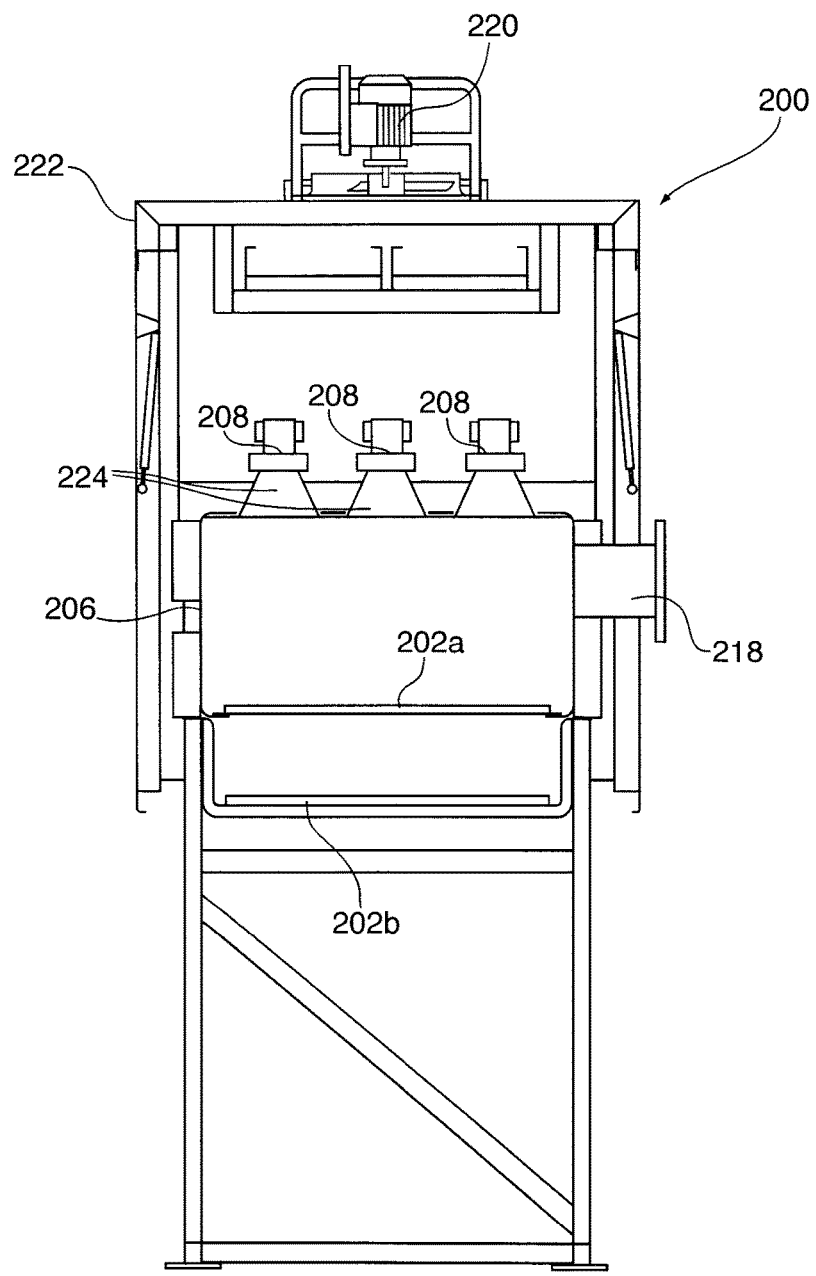
FIG. 3C is a cross-sectional view of the microwave tunnel module taken along line 3C-3C of FIG. 3B.

As shown in FIG. 3, the microwave tunnel module 200 comprises the tunnel conveyor 202, a microwave chamber 206 and a plurality of microwave generators, also known as magnetrons 208. The microwave chamber 206 may be made of sheet metal such as stainless steel, or another suitable material. The microwave tunnel module 200 may further comprise microwave traps to prevent the escape of microwave radiation from the microwave chamber 206, such as microwave-impermeable curtains 204 disposed at the entrance to the microwave chamber 206 and microwave-impermeable curtains 210 disposed at the exit of the microwave chamber 206.

The tunnel conveyor 202 may comprise an endless belt conveyor that is permeable to microwaves. For example, the belt may be formed from a stainless steel mesh or screen with openings large enough to allow the passage of microwave radiation therethrough, so that every side of the tire 2 is exposed to the microwave radiation (the lower side of the tire 2 receiving microwave radiation reflected off the floor of the microwave chamber 206 beneath the belt). Where the tunnel conveyor 202 comprises an endless belt conveyor, the tunnel conveyor 202 may have a process path 202a and a return path 202b to create a continuous loop of the conveyor belt. Tires 2 are conveyed along the process path 202a.

The overall shape of the microwave chamber 206 will preferably be chosen to accommodate the organic material and the tunnel conveyor 202. For tires 2 and an endless belt conveyor, a microwave chamber 206 of rectangular cross-section is effective.

A plurality of magnetrons 208 is mounted to at least one wall of the microwave chamber 206. As illustrated in FIG. 1, the magnetrons 208 may be arranged in rows and columns. In the embodiment shown, magnetrons 208 are mounted to the ceiling of the microwave chamber 206 in an arrangement having thirty-five rows of three magnetrons 208 each.

The magnetrons 208 may comprise small microwave generators, such as 1.2 kW magnetrons. As the focus of the microwaves contributes significantly to the efficiency of the system, a waveguide 224 may be provided with each magnetron 208 to focus the microwaves generated by each magnetron 208 into a cone that overlaps neighbouring microwave radiation cones. The overlap of the microwave radiation cones can provide more uniform microwave coverage of the process path 202a and further can provide redundancy in the event that one or more magnetrons 208 fails.

The microwave energy emitted by each of the small microwave generators may be independently controlled such that the microwave energy at any given location along the process path 202a can be varied and adjusted to a desired concentration. The output from each of the wave generators may be continuous, pulsed or otherwise varied as desired. The strength of the microwaves generated by each magnetron 208 can also be varied by varying the power input to the magnetron 208, since in the embodiment shown each magnetron 208 has its own power supply. The magnetrons 208 may also be tuned for optimal effectiveness on the organic material being processed. For example, for rubber tires, the magnetrons 208 may be advantageously tuned to emit microwave radiation at about 2250 MHz. The controller processing means and associated software for setting and varying characteristics of the microwave radiation is well known to those skilled in the art.

The microwave chamber 206 and magnetrons 208 may be housed in an outer enclosure 222 formed from any suitable material. The outer enclosure 222 protects the magnetrons 208 and may be equipped with exhaust fans and vents 220 to dissipate heat generated by the magnetrons 208.

It can be advantageous to monitor the surface temperature of the organic material, as surface temperature of the organic material substantially affects microwave absorption by the material. The power input to the microwave generators may be adjusted as required to maintain an optimum surface temperature for microwave absorption, given the nature of the organic material being reduced. Thus, as the reactions proceed as the material moves through the microwave chamber 206, a lower energy input may be required to maintain the optimum surface temperature of the organic material. Downstream microwave generators may thus be controlled to operate at lower power, for example diminishing in the rows of magnetrons 208 as they approach the microwave curtain 210. The internal temperature of the organic material in the microwave chamber 206 may also be monitored as a means of predicting what products are likely to be eliminated from the organic material at any point in the reduction process.

One or more port valves 218 may be provided along one or more walls of the microwave chamber 206, to remove gaseous products. The port valves 218 may be used to collect gaseous products, to be recycled as feedstock and/or for monitoring or testing purposes. The collected gaseous products may be analyzed to determine their composition during the reduction process. Where multiple port valves 218 are spaced apart along the length of the microwave chamber 206, valuable information may be gained by analyzing the composition of the gaseous products taken from various points along the process path 202a. For example, based on the composition of samples taken from various points along the process path 202a, one may determine at what point along the process path 202a the tire 2 is completely broken down, and can adjust the strength of the microwaves generated by the various magnetrons 208 accordingly to improve the efficiency of the system.

Adjustments to the system based on such feedback may be done automatically by the controller, manually by an operator, or by a combination thereof. As different concentrations of constituent gases may be produced at different stages of the reduction of the organic material, an analysis of location-specific samples of gaseous products may also provide valuable information as to where in the process it would be most efficient to extract recyclable products. For example, if such an analysis reveals a greater concentration of hydrogen gas given off in early stages of the reduction and a greater concentration of methane gas in later stages of the reduction, it may be more efficient to process the gaseous products from a port valve disposed near the beginning of the process path 202a for collection of hydrogen, and to process the gaseous products from a port valve disposed toward the end of the process path 202a for collection of methane.

Figure 4:
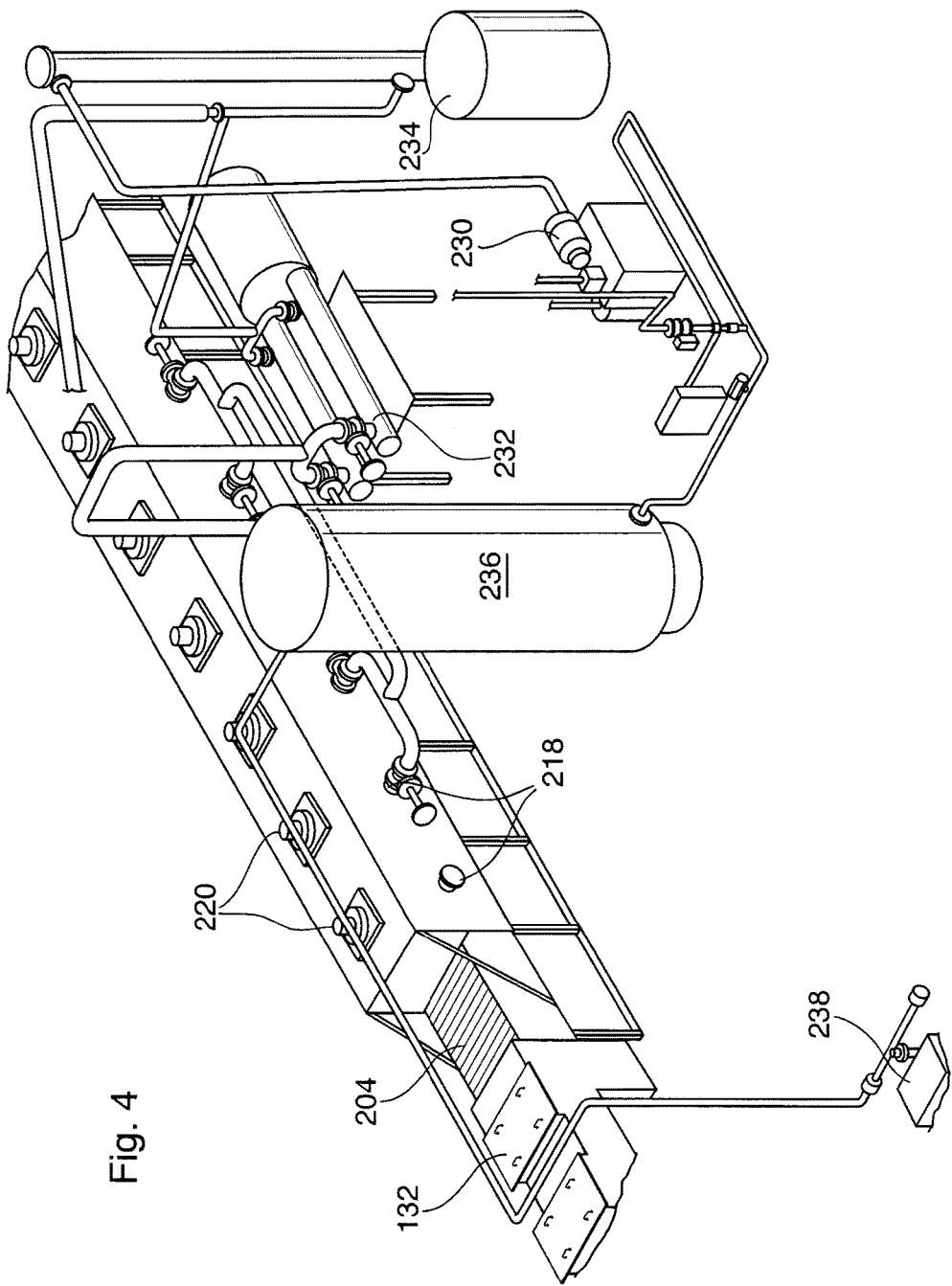
FIG. 4 is a perspective view of a process gas system for the microwave tunnel module of FIG. 1.

The microwave chamber 206 may be kept slightly above atmospheric pressure to facilitate the removal of gaseous products. In one embodiment illustrated in FIG. 4, gaseous products may also be drawn by a compressor 230 through a condenser 232 and/or a scrubber 234. The condenser may, for example, be designed to condense heavier, oil-based hydrocarbons in the gas to a liquid state so that the hydrocarbons may be collected. Examples of scrubbers that may be used include chlorine/caustic scrubbers and sulfur dioxide scrubbers. The compressor 230 may then compress the remaining gaseous product into a pressure vessel 236 which feeds a gas engine or turbine to generate electricity 238. The power generated by the generator may be used in the operation of the present system, and any excess power may be supplied to a power grid or used in some other advantageous manner. Alternately the gases could be treated further, separating the different types of gases into liquids by further compression. The collected liquids could then be sold or utilized in other processes. Depending upon the type of organic material being reduced and the efficiency of the reduction process, during continuous operation the entire apparatus can potentially be powered by the generator 238.

The microwave tunnel module 200 is connected to the outfeed module 300 at opening 318. The outfeed module 300 comprises a liquid sealed portion 302, a paddle wheel assembly 304, a screw conveyor 308 and an inclined conveyor 310.

Figure 5A:
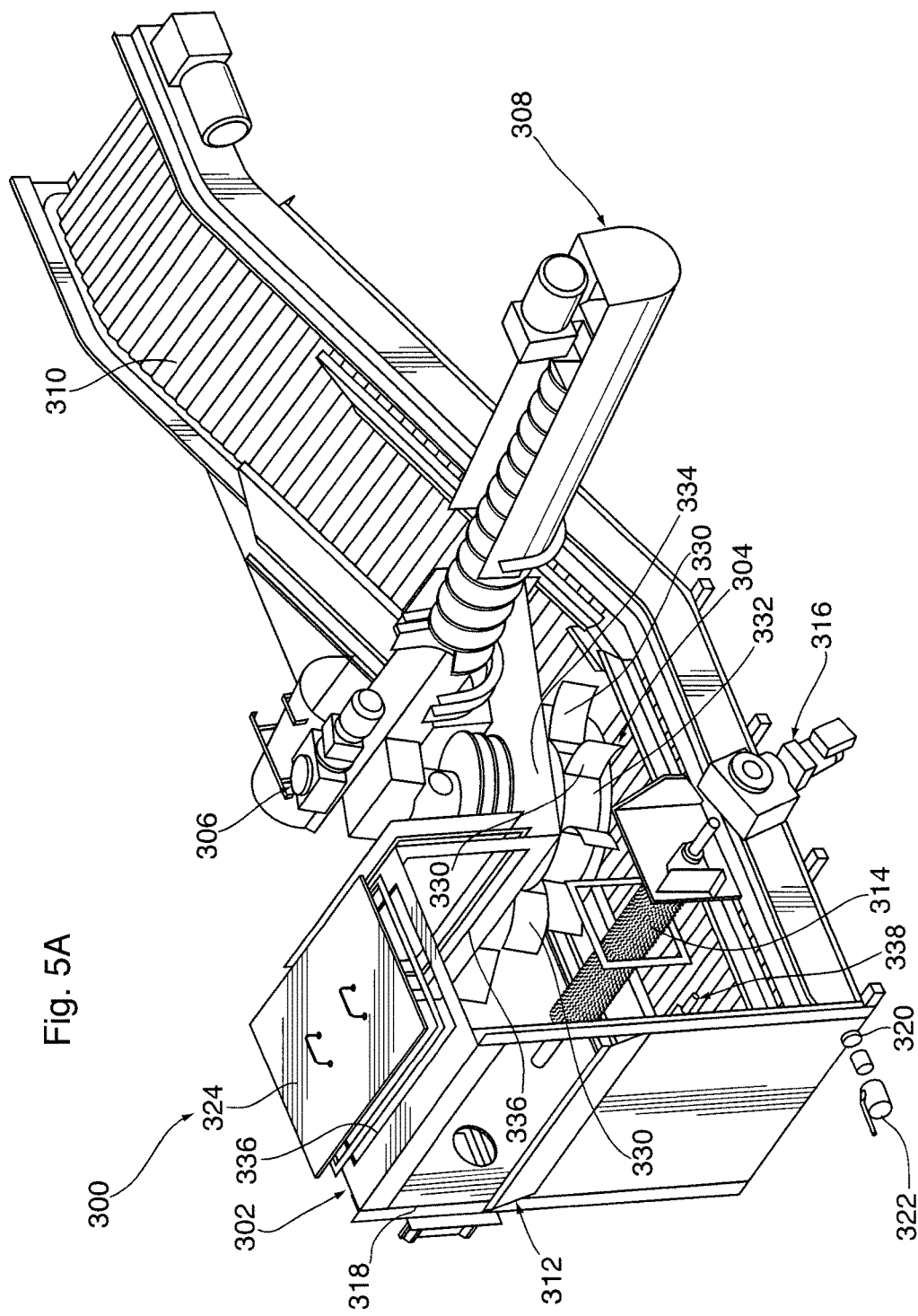
FIG. 5A is a partially exploded perspective view of an outfeed module.
Figure 5B:
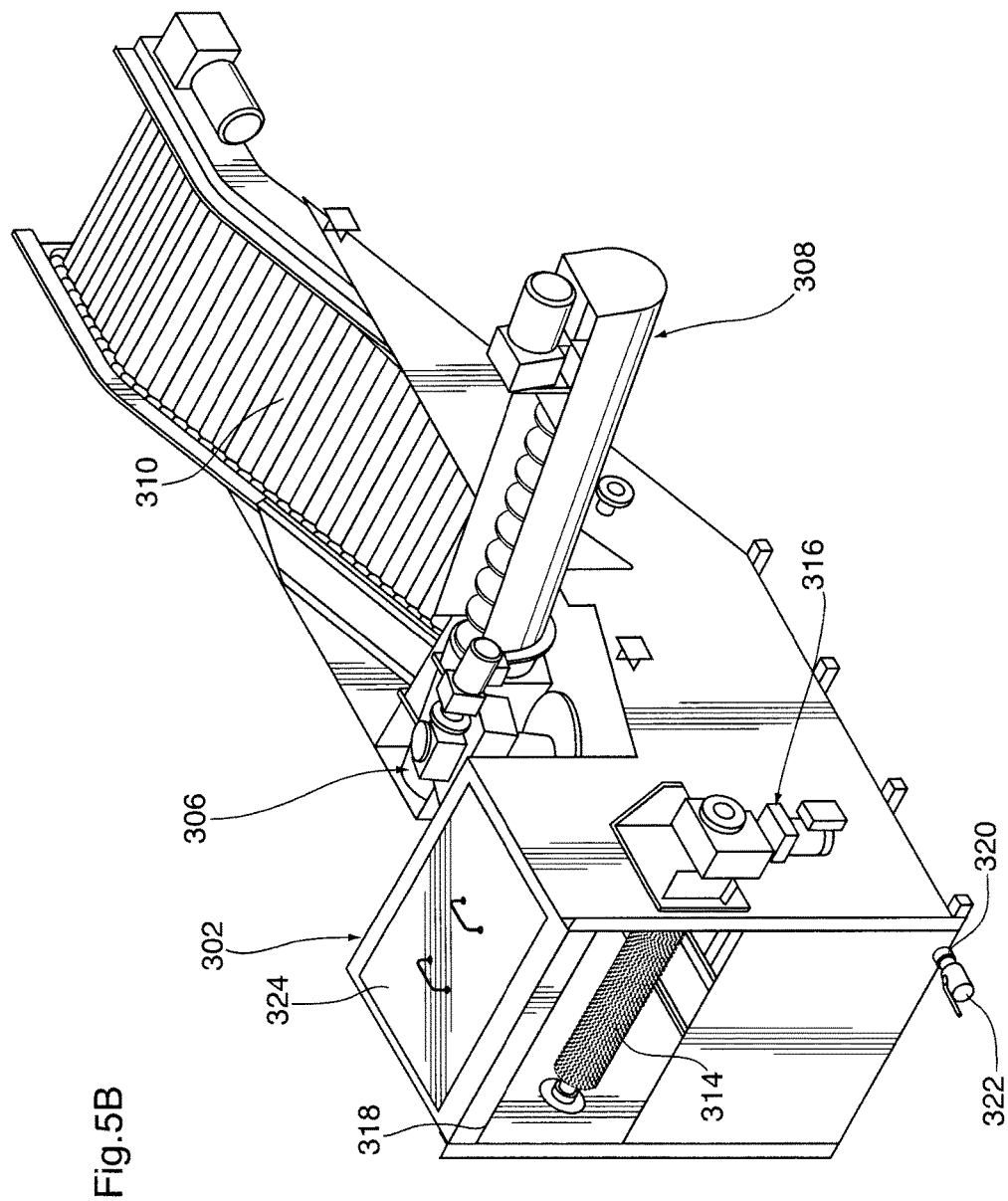
FIG. 5B a perspective view of the outfeed module of FIG. 5A.
Figure 5C:
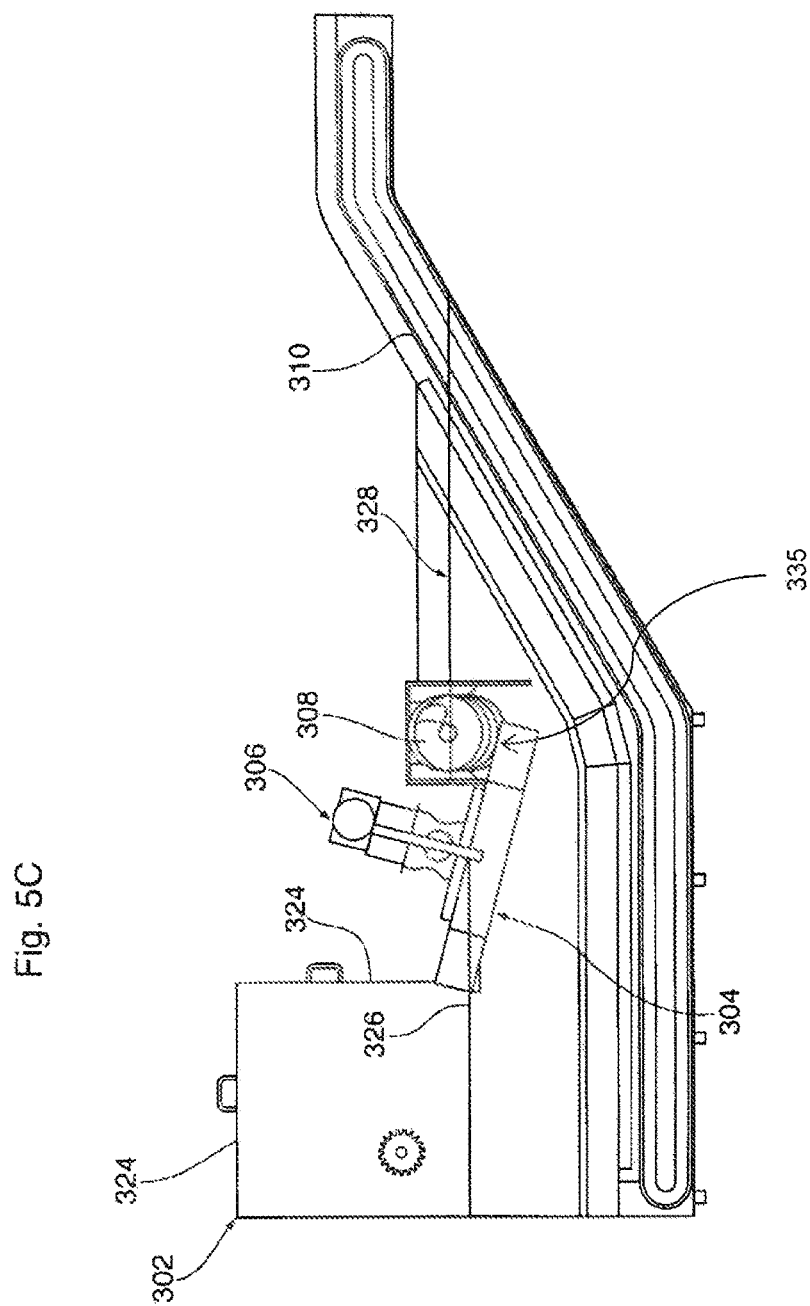
FIG. 5C is a side elevational view of the outfeed module of FIG. 5A.

The downstream end of the tunnel conveyor 202 extends into the liquid sealed portion 302 of the outfeed module 300 through opening 318. The downstream drive shaft 314 of the tunnel conveyor 202 may be built into the outfeed module 300 as shown in FIGS. 5A-5C and may be driven by motor 316. A half-horsepower, explosion-proof SEW-EURO-DRIVE variable speed AC motor is an example of a motor that may be used for this purpose. Jets may be provided in the liquid sealed portion 302 to clean off the tunnel conveyor 202 before the conveyor belt 202 returns to the microwave chamber 206 along return path 202b. A back deflector 312 may be provided to catch and redirect liquid dripping or splashing off of the conveyor belt 202 back into the liquid sealed portion 302.

The liquid sealed portion 302 serves as a trap to prevent the escape of gas from the microwave chamber 206, while facilitating the collection of constituent components of the solid products resulting from the reduction reaction.

In the embodiment of FIGS. 5A-5C, the liquid sealed portion 302 holds liquid, for example water, and functions similarly to a U-trap, as a low portion 335 of the ceiling 334 of the liquid sealed portion 302 is submerged below water lines 326 and 328. Gas from the microwave chamber 206 is therefore trapped in the liquid sealed portion 302. The water lines 326, 328 would in atmospheric pressure be at the same level, however the water line 326 of the liquid sealed portion 302 may be lower than water line 328 at the open end of the outfeed module 300 when the pressure in the microwave chamber 206 is higher than atmospheric pressure.

The liquid sealed portion 302 may have one or more portals 336 closed by covers 324, allowing access to the components within the liquid sealing portion 302. The liquid sealed portion 302 may also comprise an aperture 320 with a valve 322 toward the floor of the liquid sealed portion 302 for draining of liquid that may be contained therein. A supply pipe assembly 338 may also be provided to fill the liquid sealed portion 302 with liquid, to replenish the liquid supply.

As at least two of the three gates 108, 112, 116 of the infeed module 100 are closed at any given time during continuous operation, and gas from the microwave chamber 206 is trapped by the liquid sealed portion 302 of the outfeed module 300, the reducing atmosphere of the microwave chamber 206 is maintained and gases are prevented from escaping from the apparatus. The infeed module 100, the microwave tunnel module 200 and the outfeed module 300 are thus connected in a fashion which maintains the continuity of this hermetic seal while allowing for selective communication between the interiors of the infeed module 100, the microwave tunnel module 200 and the outfeed module 300 for the passage of organic material from one stage to the next stage.

To separate and collect constituents of the solid products, solid products remaining on the tunnel conveyor 202 upon exiting the microwave chamber 206 fall off the end of the tunnel conveyor 202 into the liquid of the liquid sealed portion 302. In the foregoing example of a system for the non-pyrolytic reduction of tires 2, the solid products mainly comprise carbon black and steel. As carbon black is less dense than water, the carbon black floats on the water while the steel sinks in the water. The carbon black and the steel may thus be separated by the water, the lighter components being skimmed or otherwise drawn off the surface of the water. As will be appreciated by a person skilled in the art, any solid products of organic materials comprising one or more components less dense than the liquid in the liquid seal portion 302 and one or more components more dense than the liquid may be separated in a similar manner.

The carbon black is collected from the surface of the water by a paddle wheel assembly 304. The paddle wheel assembly 304 has paddle blades 330 that extend substantially radially from a wheel 332 and a motor 306 to drive rotation of the wheel 332. An example of a motor that may be used is a ⅙ horsepower, explosion proof SEW-EURO-DRIVE™ variable speed AC motor. The paddle wheel assembly may be mounted on the ceiling 334 of the liquid sealed portion 302 near the water line 326 such that a portion of the paddle blades 330 are exposed above the water line 326 through an arc of rotation to scoop or push floating carbon black toward the uptake end of the screw conveyor 308. The paddle blades 330 may be concavely curved in the direction of rotation of the wheel 332 to better scoop or push the carbon black onto the screw conveyor 308. Although substantially parallel to the surface of the water, the paddle wheel assembly 304 may be tilted such that the portion closest to the screw conveyor 308 is lower in the water than the portion closest to opening 318 so that the paddle blades 330 are partially above water through an arc of rotation closest to the opening 318. Tilting the paddle wheel assembly 304 may improve the efficiency of transfer of the carbon black onto the screw conveyor 308 as the uptake end of the screw conveyor 308 is partially submerged in the liquid to receive the carbon black. The screw conveyor 308 conveys the carbon black to storage means, such as a bagging system (not shown). The screw conveyor 308 may be inclined upwardly from the uptake end to the output end, which may facilitate the drying of the carbon black by allowing entrained liquid to run back into the liquid sealed portion 302.

The steel is collected by the inclined collection conveyor 310. The inclined collection conveyor 310 lines the bottom of the liquid sealed portion 302 and preferably has an inclined portion that separates the load from the liquid at the open end of the outfeed module. The collection conveyor 310 may, for example, comprise a drag conveyor or a chip conveyor with a hinged steel belt conveyor such as the Chip-Tote conveyor. The steel portion of the solid product deposited into the liquid sealed portion 302 sinks onto the inclined collection conveyor 310 and is transported by the inclined collection conveyor 310 out of the liquid at the open end of the outfeed module for collection, into a container such as in a bin (not shown).

Although embodiments of a system and process for reduction of tires has been described, those skilled in the art will appreciate that the system and process may be modified for processing of other organic materials, such as shredded tires, oil shale and coal. For example, shredded tires may be processed using the above described embodiments by depositing piles of shredded tires on the infeed conveyor at regular intervals. Some minor modifications to the embodiments described above may be required for the piles of shredded tires to pass through the first, second and third gates 108, 112, 114, however the general concepts of the system and process may be applied to depolymerize shredded tires and many other types of organic material.

Various embodiments of the present invention having been thus described in detail by way of example, it will be apparent to those skilled in the art that variations and modifications may be made without departing from the invention.

What is claimed is:

1. A system for reduction of organic materials, comprising:
an infeed module for receiving material comprising organic materials and conveying the material into a reducing atmosphere, the infeed module comprising:
an infeed conveyor, for conveying the material through the infeed module,
a first purge chamber,
a first closure for isolating the first purge chamber from an ambient atmosphere outside the system,
a gas injection system in communication with the first purge chamber, for injecting a reducing gas to displace air from the first purge chamber to create a reducing atmosphere having a lowered concentration of oxygen in the first purge chamber, and
a second purge chamber in sealed communication with the first purge chamber and selectively isolated therefrom by a closure, whereby air in the second purge chamber is displaced by the reducing gas or another reducing gas to create a second reducing atmosphere in the second purge chamber having a lower concentration of oxygen than the reducing atmosphere in the first purge chamber;
a microwave tunnel, the microwave tunnel being in sealed communication with the infeed module for isolating the microwave tunnel from the ambient atmosphere outside the system, the microwave tunnel comprising:
a microwave-impervious microwave chamber comprising a plurality of magnetrons for generating microwave radiation and at least one port for removal of process gas products, and
a tunnel conveyor for receiving the material from the infeed module and transporting the material through the microwave chamber, and
at least a second closure for selectively isolating the second purge chamber from the microwave tunnel; and
at least one controller for controlling process parameters of the infeed module and the microwave tunnel, wherein the controller is configured to execute a purging process by controlling the closures of the first and second purge chambers and the gas injection system to purge the first and second purge chambers to respective predetermined oxygen levels and the predetermined oxygen level of the second purge chamber is less than the predetermined oxygen level of the first purge chamber.

2. The system of claim 1 wherein the infeed module further comprises a weight conveyor for detecting a weight of the materials.

3. The system of claim 1 wherein the first and second closures comprise flop gates.

4. The system of claim 1 wherein the reducing gas is nitrogen.

5. The system of claim 1 wherein the first purge chamber comprises at least one vent valve, which when opened allows gas to escape from the first purge chamber.

6. The system of claim 1 further comprising an oxygen sensor for the first purge chamber for monitoring a concentration of oxygen in the first purge chamber.

7. The system of claim 1 further comprising a pressure switch for the first purge chamber to limit a pressure in the first purge chamber.

8. The system of claim 1 wherein each magnetron is provided with a waveguide to focus the microwave radiation generated by the magnetron.

9. The system of claim 1 wherein the microwave tunnel further comprises a port valve for each of the at least one ports.

10. The system of claim 9 further comprising a compressor for drawing processes gas products out of the microwave chamber through the at least one port.

11. The system of claim 10 further comprising a condenser for condensing at least one component of the process gas product into a liquid.

12. The system of claim 1 further comprising an outfeed module, the outfeed module being adapted for sealed communication with the microwave tunnel, for preventing the escape of the process gas and separating at least one solid product for collection, the outfeed module comprising:
- a liquid sealed portion having an opening in sealed communication with the exit of the microwave tunnel, a floor, walls and ceiling, the floor, walls and ceiling being liquid sealed, whereby a liquid may be held in the liquid sealed portion intersecting with a low portion of the ceiling; and
- at least one mechanism for the collection of the at least one solid product.

13. The outfeed module of claim 12 wherein the ceiling is partially submerged and the at least one solid product comprises a product that floats on the liquid, wherein at least one mechanism for the collection of the solid product comprises a paddle wheel assembly for collecting the floating product from the surface of the liquid, the paddle wheel assembly having paddle blades and wherein the paddle wheel assembly is mounted such that a portion of the paddle blades is exposed above the surface of the liquid to push the floating product toward a floating product conveyor for removing the floating product from the liquid.

14. The system of claim 12 wherein a downstream end of the tunnel conveyor is positioned such that the solid products thereon are directed into the liquid of the outfeed module.

15. The system of claim 13 wherein the floating product conveyor is a screw conveyor.

16. The outfeed module of claim 12 wherein the at least one solid product comprises a product that sinks in the liquid and wherein at least one mechanism for the collection of the at least one solid product comprises a collection conveyor in the liquid sealed portion onto which the sinking product sinks for removal of the sinking product from the liquid.

17. The system of claim 1 wherein the microwave tunnel further comprises microwave impermeable curtains at the entrance and exit of the microwave tunnel.

* * * * *